United States Patent
Antony et al.

(10) Patent No.: US 7,510,500 B2
(45) Date of Patent: Mar. 31, 2009

(54) METHOD FOR CONTROLLING A DRIVE OF A HYBRID VEHICLE

(75) Inventors: Peter Antony, Lorch (DE); Wolf Boll, Weinstadt (DE)

(73) Assignee: Daimler AG, Stuttgart (DE)

( * ) Notice: Subject to any disclaimer, the term of this patent is extended or adjusted under 35 U.S.C. 154(b) by 365 days.

(21) Appl. No.: 10/566,998

(22) PCT Filed: Jul. 28, 2004

(86) PCT No.: PCT/EP2004/008418

§ 371 (c)(1), (2), (4) Date: Oct. 31, 2006

(87) PCT Pub. No.: WO2005/016681

PCT Pub. Date: Feb. 24, 2005

(65) Prior Publication Data

US 2007/0078039 A1    Apr. 5, 2007

(30) Foreign Application Priority Data

Aug. 2, 2003    (DE) ................................ 103 35 421

(51) Int. Cl.
*B60K 1/00* (2006.01)
(52) U.S. Cl. ........................................................ 477/3
(58) Field of Classification Search ............... 477/2, 477/3
See application file for complete search history.

(56) References Cited

U.S. PATENT DOCUMENTS

| 6,342,027 | B1 | 1/2002 | Suzuki |
| 6,712,734 | B1 * | 3/2004 | Loeffler ........................ 477/5 |
| 6,715,572 | B2 | 4/2004 | Shimabukuro et al. |
| 6,915,198 | B2 * | 7/2005 | Phillips et al. ................. 701/54 |
| 7,317,295 | B2 * | 1/2008 | Izumi et al. .................. 318/801 |
| 2002/0170758 | A1 | 11/2002 | Shimabukuro et al. |

(Continued)

FOREIGN PATENT DOCUMENTS

DE    44 22 554 C1    6/1994

(Continued)

OTHER PUBLICATIONS

Notification of Reason for Refusal dated Apr. 2, 2008 with English translation (Six (6) Pages).

*Primary Examiner*—Ha D. Ho
(74) *Attorney, Agent, or Firm*—Crowell & Moring LLP

(57) ABSTRACT

A method for controlling a drive (16) of a motor vehicle having an internal combustion engine (10) and an electric motor (24). A main transmission (16) having an output shaft (18) is connected to a driveshaft (19) of the motor vehicle, and an input shaft (14) is connected to the internal combustion engine (10). The electric motor (24) is coupled to the input shaft (14) or the output shaft (16) of the main transmission (16) by an intermediate transmission (22) having at least two transmission ratio steps. In order to accelerate the motor vehicle from rest, the drive is initially effected solely by the electric motor (24) with the intermediate transmission (22) in its lowest transmission ratio step. The drawing is then taken over by the internal combustion engine (10) before a shift operation in the intermediate transmission (22). In this case, the intermediate transmission (22) is preferably a claw shift transmission.

5 Claims, 3 Drawing Sheets

U.S. PATENT DOCUMENTS

2007/0107957 A1 * 5/2007 Lehrer .................. 180/65.2

FOREIGN PATENT DOCUMENTS

| | | |
|---|---|---|
| DE | 195 30 231 A1 | 8/1995 |
| DE | 195 30 233 A1 | 8/1995 |
| DE | 197 45 995 A1 | 9/1998 |
| DE | 100 08 344 A1 | 2/2000 |
| DE | 198 42 496 A1 | 3/2000 |
| DE | 199 63 400 A1 | 7/2001 |
| DE | 102 24 189 A1 | 5/2002 |
| EP | 903258 A2 * | 3/1999 |
| EP | 1 080 792 A2 | 4/2001 |
| EP | 1 104 712 A2 | 6/2001 |
| EP | 1 236 603 A2 | 9/2002 |
| JP | 10-98804 A | 4/1998 |
| JP | 2000-203287 A | 7/2000 |
| JP | 2003-48460 A | 2/2003 |
| WO | WO 99/50084 A1 | 10/1999 |

* cited by examiner

METHOD FOR CONTROLLING A DRIVE OF A HYBRID VEHICLE

BACKGROUND AND SUMMARY OF THE INVENTION

The invention relates to a method for controlling a drive of a motor vehicle having an internal combustion engine and an electric motor (hybrid vehicle), and in particular to a method for controlling a drive of a hybrid vehicle in which the input shaft or the output shaft of the main transmission is connected to the electric motor by means of an intermediate transmission having at least two transmission ratio steps.

A hybrid vehicle having an internal combustion engine and an electric motor, in which the input shaft of the main transmission is connected to the electric motor by means of an intermediate transmission having at least two transmission ratio steps, is known, for example, from German Patent Document DE 198 42 496 A1. The intermediate transmission (or compound transmission) of the electric motor having at least two transmission ratio steps allows the electric motor to work in an optimum way in every operating range of the hybrid vehicle. It is proposed in particular to increase the transmission ratio of the intermediate transmission when a downshift takes place in the main transmission when there is a sudden acceleration demand.

Furthermore, many documents are known which disclose a hybrid vehicle having an internal combustion engine and an electric motor, in which the intermediate transmission between the electric motor and the input shaft of the main transmission has only one transmission ratio step. Various control systems are proposed in this case to obtain as smooth a gear-change as possible and/or as smooth a changeover as possible between the provision of drive by the electric motor and the provision of drive by the internal combustion engine. In most methods, it is ensured that the electric motor or the internal combustion engine is connected to the respective other drive only after the speeds of the electric motor and internal combustion engine have been synchronized and/or that during a shift operation in the main transmission, the speed of the input shaft of the main transmission is regulated or synchronized by the electric motor.

At this point, reference is made by way of example to German Patent documents DE 44 22 554 C1, DE 195 30 231 A1, DE 195 30 233 A1, DE 100 08 344 A1, DE 102 24 189 A1, European Patent documents EP 1 090 792 A2, EP 1 104 712 A2, EP 1 236 603 A2, and United States Patent documents U.S. Pat. No. 6,342,027 B1 and US 2002/0170758 A1.

In contrast thereto, it is the object of the present invention to provide a method for controlling a drive of a hybrid vehicle, in which the input shaft or the output shaft of the main transmission is connected to the electric motor by means of an intermediate transmission which has at least two transmission ratio steps and permits a comfortable shift between the transmission ratio steps of the intermediate transmission of the electric motor.

According to the invention in order to accelerate the motor vehicle from rest, the drive is initially effected solely by the electric motor, the intermediate transmission being in its lowest transmission ratio step, and driving then being taken over by the internal combustion engine before a shift operation in the intermediate transmission.

This method ensures that the internal combustion engine at least partially always takes over the drive function of the main transmission before the intermediate transmission of the electric motor shifts to a higher transmission ratio step, so that a smooth shift is obtained, between the transmission ratio steps of the intermediate transmission in order to provide a comfortable ride for the driver. An interruption in tractive force during a shift operation of the intermediate transmission is thus reliably prevented.

In one preferred embodiment of the invention, the intermediate transmission of the electric motor is embodied as a claw shift transmission. This has the advantage that a relatively simple shift transmission for the electric motor is sufficient, by virtue of the fact that the internal combustion engine takes over the provision of drive torque for the drive in the pause in the shifting of the intermediate transmission.

In one embodiment of the invention, driving is taken over gradually by the internal combustion engine before a shift operation in the intermediate transmission, the drive torque supplied by the internal combustion engine being increased to the same extent as the drive torque supplied by the electric motor is reduced.

In a further preferred embodiment of the invention, driving is taken over by the internal combustion engine as a function of a detectable acceleration demand of the motor vehicle. The acceleration demand of the motor vehicle can be detected in this case, for example, from the accelerator pedal position and/or from the vehicle speed.

In a further embodiment of the invention, an energy store which is connected to the electric motor is intermediately discharged, the electric motor is operated in a regenerative mode, the electric motor is operated in a booster mode and the like only in at least the second transmission ratio step of the intermediate transmission. As a result, the electric motor can be of relatively small and simple design.

If appropriate, the motor vehicle can also be accelerated from rest solely by the internal combustion engine as drive if, for example, the energy store which is connected to the electric motor is discharged to too great an extent, is too cold or overheated.

The features and combinations of features given above, as well as other features and combinations of features, are disclosed in the description and in the drawings. Various specific exemplary embodiments of the invention are illustrated in a simplified manner in the drawings and are described in more detail in the following description.

DETAILED DESCRIPTION OF THE DRAWINGS

Figure 1:
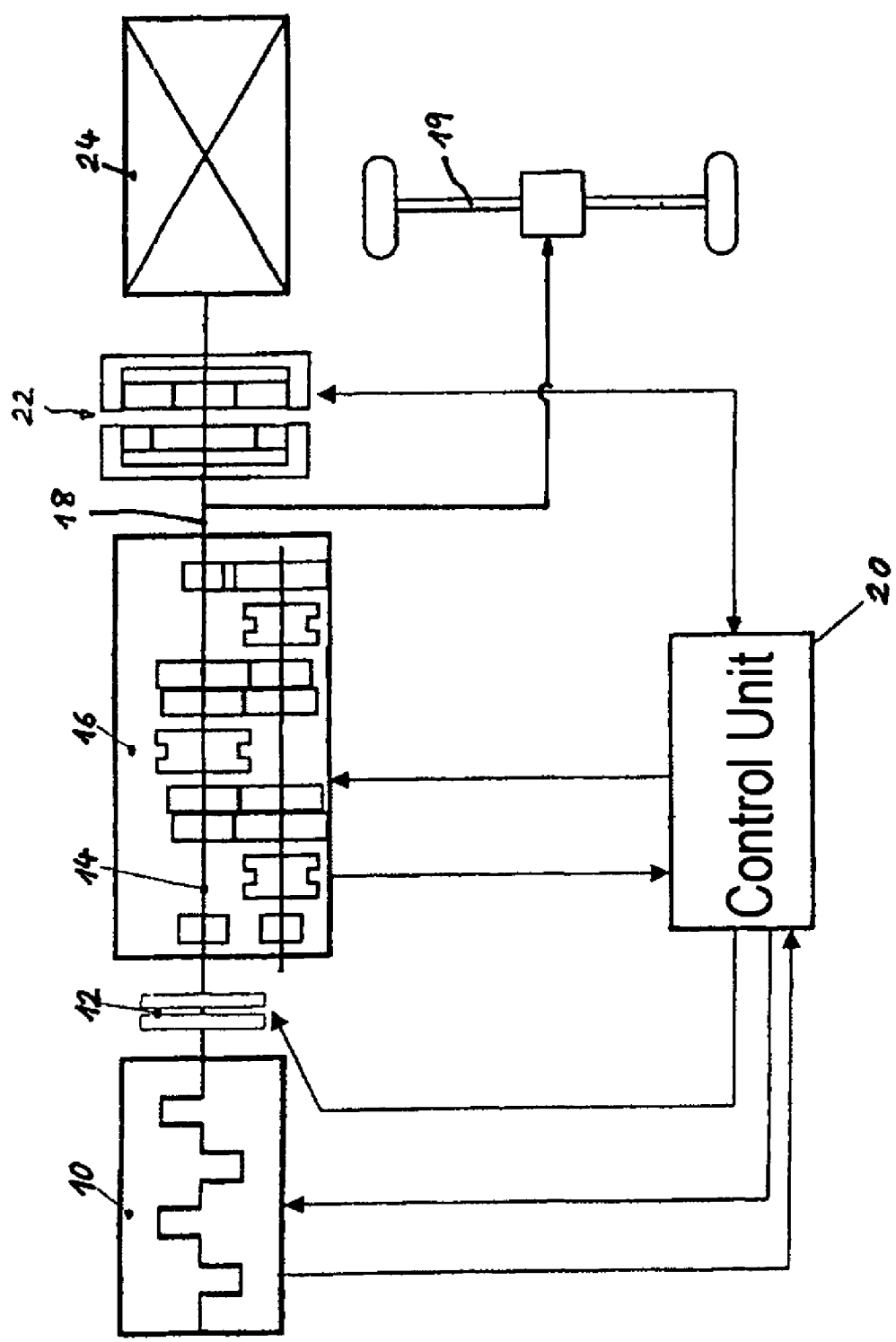
FIG. 1 shows a schematic illustration of a drivetrain of a motor vehicle having an internal combustion engine and an electric motor, in which the control method according to the invention can be used.

FIG. 1 schematically illustrates part of a drivetrain of a motor vehicle. The reference numeral 10 denotes an internal combustion engine whose output torque is supplied via a main clutch 12 to an input shaft 14 of a main transmission 16 having a plurality of transmission ratio steps or gears. An output shaft 18 of the main transmission 16 is connected to a driveshaft 19 of the motor vehicle. The output torque and the output speed of the internal combustion engine 10, the main clutch 12 and the transmission ratio steps or gears of the main transmission 16 are controlled by a control unit 20.

In addition, an electric motor 24, which is embodied as a starter-generator, is connected via an intermediate transmission 22 to the output shaft 18 of the main transmission 16. This intermediate transmission 22 has two (or more) transmission ratio steps or gears. In one embodiment, the intermediate transmission is an unsynchronized claw shift transmission as illustrated by way of example in FIG. 3.

Figure 2:
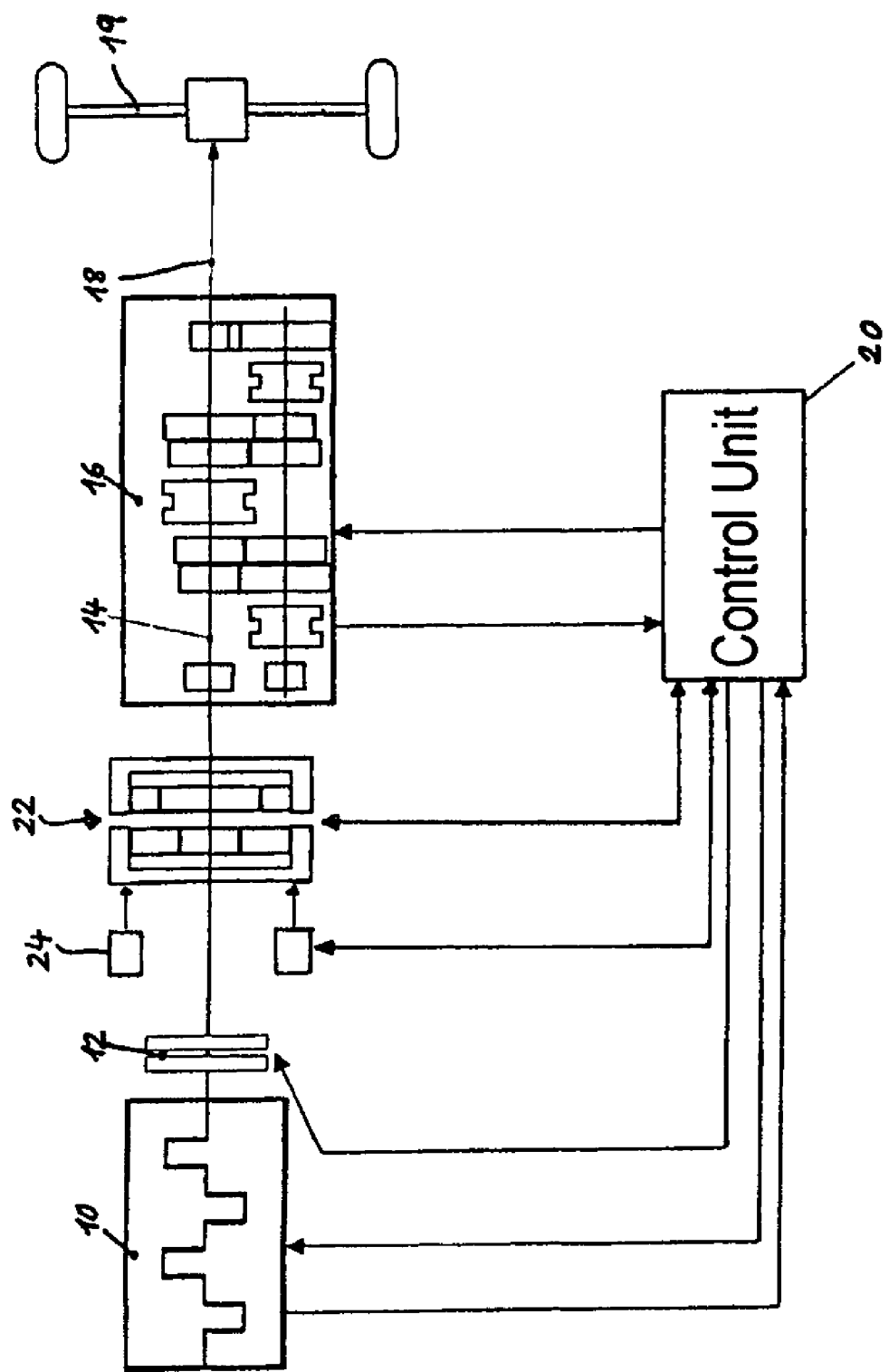
FIG. 2 shows a schematic illustration of an alternative drivetrain of a motor vehicle having an internal combustion engine and an electric motor, in which the control method according to the invention can be used.
Figure 3:
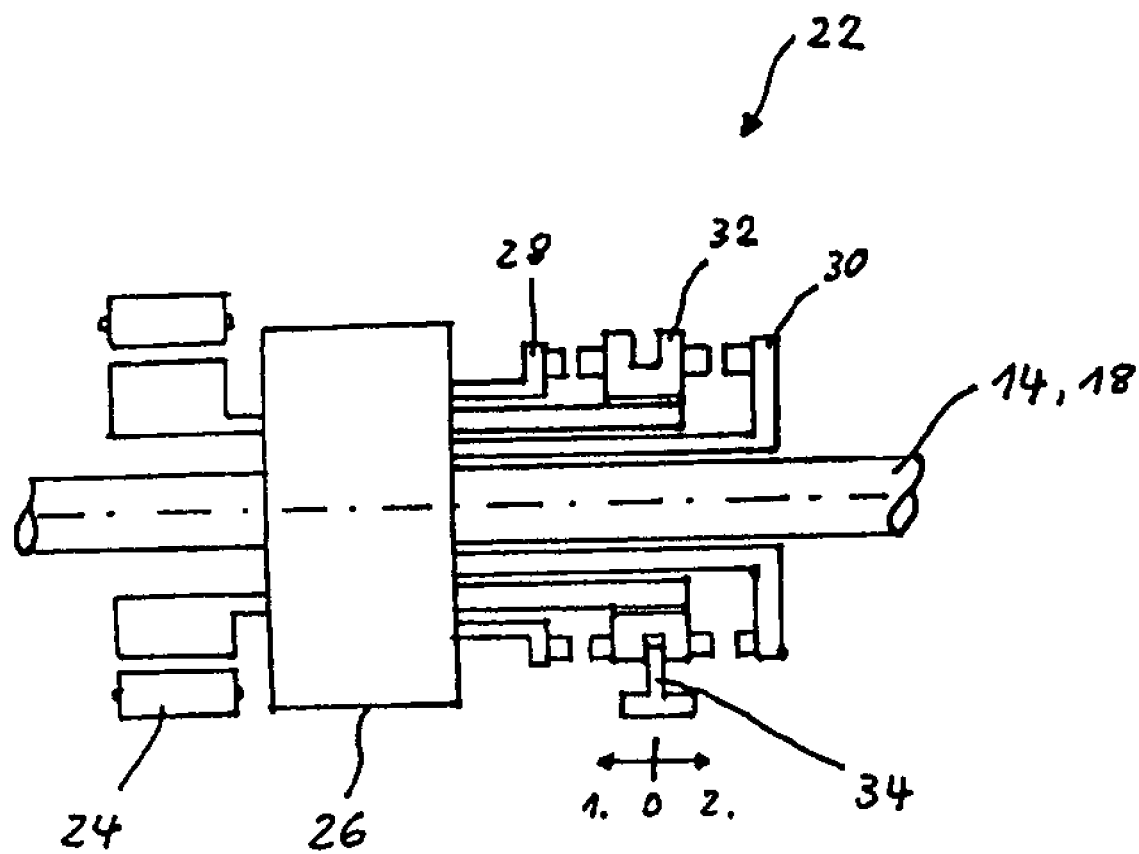
FIG. 3 shows a schematic illustration of the design of an embodiment of the intermediate transmission of the drivetrain in FIGS. 1 and 2.

The motor vehicle drivetrain variant illustrated in FIG. 2 differs from the embodiment in FIG. 1 in that the intermediate transmission 22 of the electric motor 24 is coupled to the input shaft 14 of the main transmission 16. This intermediate transmission 22 is also preferably an unsynchronized claw shift transmission having at least two transmission ratio steps as illustrated in FIG. 3. The other components of the drivetrain in FIG. 2 correspond to those of the exemplary embodiment illustrated in FIG. 1 and are denoted by identical reference numerals.

The exemplary embodiment of an intermediate transmission 22 illustrated in FIG. 3 comprises a stepped epicyclic transmission 26 which is connected to the electric motor 24 and coupled to a first claw wheel 28 for the first gear and to a second claw wheel 30 for the second gear, which are arranged coaxially with respect to the output shaft 18 or the input shaft 14 of the main transmission 16 or a driveshaft which is connected to the latter. A driving wheel 32, which is connected in a rotationally fixed manner to the input shaft 14 or output shaft 18, is provided in the axial direction between the first claw wheel 28 and the second claw wheel 30. This driving wheel 32 can be displaced by means of a shift sleeve or shift fork 34, which can be actuated by the control unit 20, in the axial direction between a first engagement position with the first claw wheel 28, a second engagement position with the second claw wheel 30, and a central idling position in which the driving wheel is engaged neither with the first claw wheel nor with the second claw wheel.

The mode of operation of this drivetrain of a motor vehicle, which is explained on the basis of FIGS. 1 to 3, is as follows.

In the normal operating mode, that is to say when the energy store which is coupled to the electric motor 24 is sufficiently charged and is also neither too cold nor overheated, the motor vehicle is initially driven from rest exclusively by means of the electric motor 24, the control unit 20 actuating the intermediate transmission 22 in the lowest transmission ratio step ($1^{st}$ gear).

Before a shift operation in the intermediate transmission 22 to the next transmission ratio step ($2^{nd}$ gear), and depending on the acceleration demand, which can be detected, for example, on the basis of the accelerator pedal position and/or the vehicle speed, the internal combustion engine 10 is then started up and connected by means of the main clutch 12 and in as jerk-free a manner as possible to the input shaft 14 of the main transmission 16. The internal combustion engine 10 is connected in such a way that the drive torque which is gradually transmitted to the input shaft 14 by the internal combustion engine 10 is increased to the same extent as the drive torque supplied by the electric motor 24 to the output shaft 18 or to the input shaft 14 is reduced, until the electric motor 24 rotates without providing drive. For the method according to the invention, it is in this case irrelevant whether the drive torque of the internal combustion engine is applied by means of a slipping main clutch 12 without synchronization of the drive speed of the internal combustion engine 10 or is applied by closing the main clutch 12 only after the drive speed has been synchronized.

This method avoids jerking during a shift in the intermediate transmission 22 of the electric motor 24 from the first transmission ratio step to a higher transmission ratio step because the internal combustion engine 10 takes over the driving function of the main transmission 16 between the first and the second transmission ratio steps, so that a smooth and comfortable shift in the intermediate transmission 22 is possible which has no interruption in tractive force and is practically imperceptible for the vehicle occupants.

As soon as the internal combustion engine 10 has taken over the task of driving the main transmission 16, the electric motor 24 then essentially serves to absorb braking energy (regenerative mode). Only if the energy store which is connected to the electric motor 24 exceeds a predefined charge state does the electric motor 24 revert to contributing to supplying drive power for the purpose of discharging, in order to obtain a sufficient buffer capacity in the energy store again. According to the invention, however, the function of the regenerative mode of the electric motor 24, the intermediate discharge of the energy store, a booster mode of the electric motor 24 and the like do not take place until a second (or if appropriate higher) transmission ratio step of the intermediate transmission 22 is engaged. This has the advantage that the electric motor 24 can be made relatively small and does not have to fulfill too many conflicting design criteria. In addition, the intermediate transmission 22 as described above can be constructed relatively easily because it has only one gear change device which can be shifted by means of claw wheels 28, and which is actuated by means of a shift fork 34. The synchronization of the electric motor 24 before the claw wheels 28, 30 of the intermediate transmission 22 are connected can be carried out by the electric motor 24 itself.

At relatively high driving speeds, the electric motor 24 is normally decoupled and switched to a currentless state in order to avoid drag losses.

While the above embodiments are applicable in the normal operating mode of the motor vehicle, in the event of a fault or in certain operating ranges of the motor vehicle, if for example the energy store which is connected to the electric motor 24 is discharged to too great an extent, is too cold or overheated for a purely electrical start procedure, the internal combustion engine can if appropriate take over the start procedure on its own from the beginning.

A specific exemplary design is described in more detail in the following in order to further illustrate the method according to the invention for the control of the hybrid vehicle.

In a typical medium-sized vehicle having a weight of for example 1,500 kg, an electric motor 24 having a power of 20 kW can be used. The maximum vehicle speed for the intermediate transmission 22 of the electric motor 24 is, for example, 35 km/h in first gear in the embodiment in FIG. 1, and, for example, 130 km/h in second gear, while the maximum vehicle speed can be, for example, 220 km/h. At a vehicle speed of over 130 km/h, the intermediate transmission 22 is accordingly set to the idling position.

If the design speed of the electric motor 24 in the first gear and in the second gear of the intermediate transmission 22 should in each case be 10,000 rev/min, then given a design speed of the input shaft 14 of the main transmission 16 of 7,000 rev/min at maximum vehicle speed, a transmission ratio of 8.98 is obtained in the first gear of the intermediate transmission 22, while a transmission ratio of 2.42 is obtained in the second gear of the intermediate transmission.

According to the above described method of the invention, the internal combustion engine in a hybrid vehicle is, during normal acceleration of the motor vehicle from rest, connected for example after approximately 1.6 seconds. In contrast, when accelerating more quickly, the internal combustion engine 10 can be connected after as little as approximately 0.8 seconds; and when the motor vehicle accelerates very rapidly from rest, the internal combustion engine can even be connected immediately.

The invention claimed is:

1. A method for controlling a drive (16) of a motor vehicle having an internal combustion engine (10) and an electric motor (24), a main transmission (16) having an output shaft (18), which is connected to a driveshaft (19) of the motor vehicle, and an input shaft (14), which is connected to the internal combustion engine (10), the electric motor (24) being coupled to the input shaft (14) or the output shaft (18) of the main transmission (16) by means of an intermediate transmission (22) having at least two transmission ratio steps, where, to accelerate the motor vehicle from rest, the drive is initially effected solely by the electric motor (24), the intermediate transmission (22) being in its lowest transmission ratio step, and the provision of drive then being taken over by the internal combustion engine (10) before a shift operation in the intermediate transmission (22), characterized in that an energy store which is connected to the electric motor (24) is intermediately discharged, the electric motor (24) is operated in a regenerative mode, the electric motor (24) is operated in a booster mode and the like only in at least the second transmission ratio step of the intermediate transmission (22).

2. The method as claimed in claim 1, characterized in that the intermediate transmission (22) is a claw shift transmission.

3. The method as claimed in claim 1 or 2, characterized in that the provision of drive is taken over gradually by the internal combustion engine (10) before a shift operation in the intermediate transmission (22), the drive torque supplied by the internal combustion engine (10) being increased to the same extent as the drive torque supplied by the electric motor (24) is reduced.

4. The method as claimed in one of claims 1 to 3, characterized in that the provision of drive is taken over by the internal combustion engine (10) as a function of a detectable acceleration demand of the motor vehicle.

5. The method as claimed in claim 4, characterized in that the acceleration demand of the motor vehicle can be detected from the accelerator pedal position and/or from the vehicle speed.

* * * * *